US006538991B1

(12) United States Patent
Kodialam et al.

(10) Patent No.: US 6,538,991 B1
(45) Date of Patent: Mar. 25, 2003

(54) CONSTRAINT-BASED ROUTING BETWEEN INGRESS-EGRESS POINTS IN A PACKET NETWORK

(75) Inventors: Muralidharan S. Kodialam, Marlboro, NJ (US); T. V. Lakshman, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/366,619

(22) Filed: Aug. 3, 1999

(51) Int. Cl.[7] .................... H04L 12/56; H04L 001/00; H04L 12/26
(52) U.S. Cl. .............. 370/229; 370/395.21; 370/395.42
(58) Field of Search ................... 370/229–235, 370/237, 238, 351–356, 389, 392, 393, 395.1–395.42, 396; 709/226, 238–243

(56) References Cited

U.S. PATENT DOCUMENTS 5,996,021 A * 11/1999 Civanlar et al. ............ 370/392
6,205,488 B1 * 3/2001 Casey et al. ................ 709/238
6,374,303 B1 * 4/2002 Armitage et al. ........... 370/390

OTHER PUBLICATIONS

'Internet QoS: A Big Picture', Xipeng Xiao; Ni, L.M., IEEE Network , vol. 13 Issue: 2, Mar.–Apr. 1999, pp: 8–18.*

* cited by examiner

Primary Examiner—Hassan Kizou
Assistant Examiner—David Odland
(74) Attorney, Agent, or Firm—Mendelsohn and Associates PC

(57) ABSTRACT

A packet network of interconnected nodes employs a constraint-based routing method to determine a path through the network for a requested label-switched path (LSP). Each of the nodes includes one or more routers that forward packets based on a forwarding table constructed from paths determined in accordance with the constraint-based routing method. The constraint-based method determines the path of the requested LSP based on the effect that routing those packets of the requested LSP may have on current and/or future demands on the capacity of network nodes for currently provisioned LSPs. Such constraint-based routing method may not necessarily route packets of a requested LSP along the shortest path, or minimum number of hops, through the network. Given the packet network and LSP request, a linear programming system is defined by a set of linear programming equations. The linear programming system is based on the network topology, the values of the ingress-egress point pair o and t and demand bd of the LSP request, and the total maxflow values of the existing ingress-egress point pair for currently provisioned LSPs. The solution is estimated for a linear programming system of either split demand, non-split demand, or batch demand implementations for routing packets of the LSP. The constraint-based routing method may solve the linear programming system using common linear programming techniques.

20 Claims, 3 Drawing Sheets

CONSTRAINT-BASED ROUTING BETWEEN INGRESS-EGRESS POINTS IN A PACKET NETWORK

CROSS-REFERENCE TO RELATED APPLICATIONS

This application is related to U.S. patent application Ser. No. 09/366,620, filed on Aug. 3, 1999, the teachings of which are herein incorporated by reference.

BACKGROUND OF THE INVENTION

1. Field of the Invention

The present invention relates to packet routing in telecommunication systems, and, more particularly, to determining paths through nodes of a packet network for routing of packets with guaranteed service levels.

2. Description of the Related Art

In interconnected communications packet networks, such as the Internet, users establish connections between a source and a destination with a stream of data packets, called packet flows, that are transferred through the network over a network path. The network path is defined by a set of nodes interconnected by a set of links. Packet networks may have a hierarchical structure in which smaller networks are interconnected by larger networks, and a peer structure in which equivalent networks are interconnected. At the highest levels, packet networks with high capacity that route packets transferred between other, outside packet networks are commonly referred to as "backbone" networks. A packet network connects to one or more other packet networks through ingress and egress points (routers) of the backbone network.

FIG. 1 shows a backbone network 100 of the prior art having nodes N1–N9 interconnected through links 101 that allow communication between packet networks 102–104. An ingress point is a router of node N1 that transfers packets to the backbone network 100 from a source (packet network 102), and an egress point is a router of node N4 that transfers packets from the backbone network 100 to a destination (packet network 104). The backbone network 100 may support an interior routing protocol to distribute network topology information and route packets between ingress and egress points based on best effort routing (e.g., destination-based shortest path) through the nodes N1–N9. A centralized network management system 105 may be employed to 1) provision virtual circuits, or packet flows, through the backbone network 100; 2) monitor capacity and utilization of links 101; and 3) coordinate calculation and installation of provisioned paths. Forwarding tables are used by each node's router to forward each received packet to the next node toward its destination. In addition, the centralized network management system 105 may also be employed to collect and distribute network topology information.

Interior routing protocols are employed by routers to determine forwarding of packets between a source and destination pair along a path through the nodes of the interconnected packet network. Packets received by a node's router are forwarded to other nodes based on a forwarding table constructed in accordance with the interior routing protocol or routes installed with explicit route provisioning. Interior routing protocols may also specify exchange network topology and link-state information ("network topology information") among routers to allow the node's router to construct the corresponding forwarding table. An example of a widely-used interior routing protocol for "best effort" routing is the Open Shortest Path First (OSPF) protocol, as outlined in J. Moy, "OSPF Version 2," Internet Draft, Request for Comment (RFC) 2178, July, 1997. In addition, some routing protocols associate a link "cost" with each link between nodes. This link cost may be associated with, for example, average link utilization or revenue generated by the link, as well as link importance in the network. When link-state information or link-bandwidth (e.g., connectivity or available bandwidth) is exchanged between routers, each router in the network has a complete description of the network's topology.

Since routing of packets at the higher levels is desirably performed at high speed, each higher-level packet network may use its own interior routing protocol in addition to the interior routing protocol of the lower-level packet network. Routing protocols, in addition to providing connectivity, may also enable traffic management. The Multi-Protocol Label Switched (MPLS) standard, for example, may allow for such routing protocols in backbone networks. The MPLS standard may be employed for networks having virtual circuits (packet flows) with provisioned service levels (also known as guaranteed quality-of-service (QoS)).

Provisioned service levels may be, for example, a guaranteed minimum bandwidth for the path of a packet flow through the backbone network. This path having a guaranteed level of service between ingress and egress points may be referred to as a Network Tunnel Path (NTP). As would be apparent to one skilled in the art, specific implementations of NTPs exist for different types of networks. As examples of NTPs, virtual circuits may be established for packet flows in TCP/IP networks, virtual circuits may be established for cells in Asynchronous Transfer Mode (ATM) networks, and label switched paths (LSPs) may be established for packets in MPLS networks. Packets of a signaling protocol, such as RSVP (Reservation Protocol for IP and MPLS networks) or LDP (Label Distribution Protocol for MPLS networks), may be used to reserve link bandwidth and establish a virtual circuit connection through an NTP, once routing for the NTP is calculated. NTPs may be provisioned as an explicit route along specific paths between nodes of the backbone network (i.e., when an NTP is provisioned, all intermediate points may be specified through which a packet passes between the ingress and egress points of the NTP).

In MPLS networks, packets are encapsulated by appending to the packet, or forming from the packet, additional information when the packet is received at an ingress point. The additional information, called a label, is used by routers of the backbone network to forward the packets. FIG. 2 shows such an encapsulated packet 200 having a label 201 appended to packet 202. The label summarizes information in the packet header. The summary may be based on the packet header fields, such as an origination (source) address field (o) 210 identifying the address of the ingress point, a termination (destination) address field (t) 211 identifying the address of the egress point(s). In some cases, the label may simply be a pointer that identifies or is otherwise related to specific origination and termination address fields in the header of the received packet. The label also includes one or more service level fields (bd) 212. Service level field 212 may identify a desired service level for the virtual circuit (called a "demand"), such as minimum bandwidth required. In some networks, the service level field is implied from the label itself. Other fields 213 may be included in the label 201, such as MPLS standard version, interior routing protocol version, maximum delay, or other types of service level parameters. The label 201 may alternatively be inserted into the packet header (PH) 214 of the packet 202, so the order of fields shown in FIG. 2 is exemplary only. Backbone networks may employ labels to group encapsulated packets having similar LSPs into classes (equivalence classes), and methods for forwarding equivalence classes may be employed to simplify calculation of routing for LSPs.

To generate a forwarding table, each router computes a set of preferred paths through the network nodes, and may use the weights to calculate the set of preferred paths. Each preferred path has a minimum total weight between nodes as well as minimum summed weight through nodes of the path, which is known in the art as shortest-path routing. This set of preferred paths may be defined with a shortest-path tree (SPT). The forwarding table with routing information isgenerated from the SPT. The router uses the routing information to forward a received packet to its destination along the shortest path of the SPT. The SPT may be calculated using an algorithm such as Dijkstra's algorithm, described in E. Dijkstra, "A Note: Two Problems In Connection With Graphs," Numerical Mathematics, vol.1, 1959, pp. 269–271.

A common shortest-path routing algorithm employed by routers to generate routing of an LSP is the min-hop algorithm. In the min-hop algorithm, each router calculates a path through the backbone network for the stream of packets (packet flows) between the ingress and egress point. Each router constructs a path for routing the packet flow from the ingress point to the egress point with the least number ("min") of feasible links ("hops") (a feasible link is a link that exists and has sufficient capacity to route the packet flow). Routing schemes of the prior art, such as shortest-path routing, forward packets based only on destination addresses and use only static and traffic-characteristic-independent link weights to calculate paths for routing tables. Some links on the shortest path between certain pairs of ingress and egress points may be congested while other links on alternate paths are under-utilized.

A signaling mechanism, such as RSVP or LDP, may be employed to both reserve and establish a connection through the network for a packet flow. The signaling mechanism may specify quality-of-service attributes for the LSP traversing the backbone network. Link congestion caused by shortest-path routing of multiple LSPs by shortest path routing may cause rejection of reservation requests by signaling mechanisms, even though sufficient levels of service (quality of service guarantees) for the LSP may have existed in alternate, under-utilized paths that are only slightly longer. Available network resources are not efficiently utilized when shortest-path routing is employed.

SUMMARY OF THE INVENTION

In accordance with embodiments of the present invention, a constraint-based routing method is employed to route data through a network of nodes interconnected by links and having a plurality of ingress-egress point pairs. A request for a path for routing the data between one of the ingress-egress point pairs of the network is received; and service levels are allocated within the links of the network for the path taking into account impacts to existing service levels of paths corresponding to the other ingress-egress point pairs of the network.

For example, the constraint-based routing method determines a preferred path for a new network tunnel path (NTP) request. The preferred path is defined between a pair of ingress and egress points through the nodes of a packet network and maintains provisioned and requested levels of Quality of Service (QoS). The preferred path through the nodes is selected so as to reduce impact to service levels of paths of other currently provisioned NTPs passing through each particular node that is selected for the preferred path. The constraint-based routing method determines the preferred path based on the network topology, remaining bandwidth on the links, and a criterion for generally maintaining relatively high QoS or other service levels over all paths between ingress-egress point pairs. Generally, the constraint-based routing method maintains relatively high service levels (i.e., bandwidth) available in existing paths for future NTP requests between all pairs of ingress and egress points in the network after routing the new NTP request. The present invention may determine routing based on the position of pairs of ingress and egress points in the packet network. The position of the ingress and egress points is related to the number of NTPs, the location of the nodes for the NTPs in the network, and capacity used by each NTP packet flow passing through interior nodes connected to the ingress and egress points. Impact to a node by routing a new NTP along a particular path may be related to the position of the NTP's ingress and egress nodes (impact being the effect on current and future demand for the node's capacity created by routing a particular NTP through the node).

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 3:
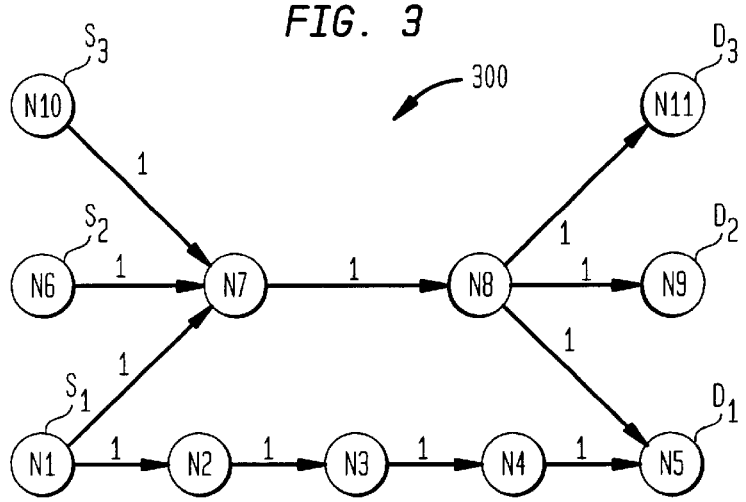
FIG. 3 shows a network of interconnected nodes that employs a constraint-based routing method for routing network tunnel paths in accordance with the present invention.

FIG. 3 shows a network 300 of interconnected nodes N1–N11 that employs a constraint-based routing method in accordance with the present invention. The constraint-based method determines a path through network 300 for a request for a network tunnel path, such as a label-switched path (LSP). Each of the nodes N1–N11 includes one or more routers that forward packets based on a forwarding table constructed from paths determined in accordance with the constraint-based routing method. The constraint-based method may route packets of the requested LSP based on the effect that routing those packets of the requested LSP may have on current and/or future demands on the capacity of network nodes for currently provisioned LSPs. The effect is also referred to as "interference" by routing packets of the LSP request along a path. Such constraint-based routing method may not necessarily route packets of a requested LSP along the minimum number of hops through the network. Such routing should maintain as much available capacity between ingress-egress points (based on a predefined criterion) after routing of the LSP request.

While the exemplary embodiments of the present invention are described herein for networks employing the MPLS standard with path requests with associated service levels, such as LSP requests, the present invention is not so limited. The present invention may be employed where requests are received for Network Tunnel Paths (NTPs) having a guaranteed level of service between ingress and egress points. NTPs may be, for example, IP-in-IP tunnels, virtual circuits in Asynchronous Transfer Mode (ATM) networks, and LSPs for packets in MPLS networks. In accordance with the present invention, routing for a new NTP request is calculated based on network topology, bandwidth (or other service level) of the links, and remaining bandwidth (or other service level) of the links when existing NPTs are routed and a request for a new NPT is received.

A network of interconnected nodes such as network 300 is defined as G(N, L, B), where N is the set of routers (nodes), L is the set of links (arcs), and B is the set of available resources for corresponding links in the set L (referred to herein as the set of link bandwidths, which may be residual bandwidths described below). For the exemplary embodiments described herein, the value for available resources such as service level is bandwidth capacity of a link or path, but the service level values may be link parameters such as delay, probability of packet loss, revenue, or other quality of service parameter. As known in the art, these other service level values may be converted to a quantity termed effective bandwidth. A link $l_{ij}$ in the set of links L has two subscripts, i and j ($0<ij \leq N$), representing the nodes $n_i$ and $n_j$ connected by link $l_{ij}$. Without loss of generality, each link $l_{ij}$ is directional (packet flows go from node $n_i$ to node $n_j$).

Sources S1, S2, and S3 in FIG. 3 may be packet networks providing packet flows to routers in nodes N1, N6, and N10, respectively. Similarly, destinations D1, D2, and D3 may be packet networks receiving packet flows from routers in nodes N5, N9, and N11, respectively. Sources S1, S2, and S3 are defined as ingress points, while destinations D1, D2, and D3 are defined as egress points. Ingress-egress point pairs are defined as (S1, D1), (S2, D2), and (S3, D3), and each node may support one or more sources, or one or more destinations. Nodes N1–N11 may also have, or have access to, current network topology and link status information (hereinafter referred to as "network topology") which may be provided and distributed through the network using a distributed protocol (e.g., by control packets conforming to the OSPF protocol).

Figure 1:
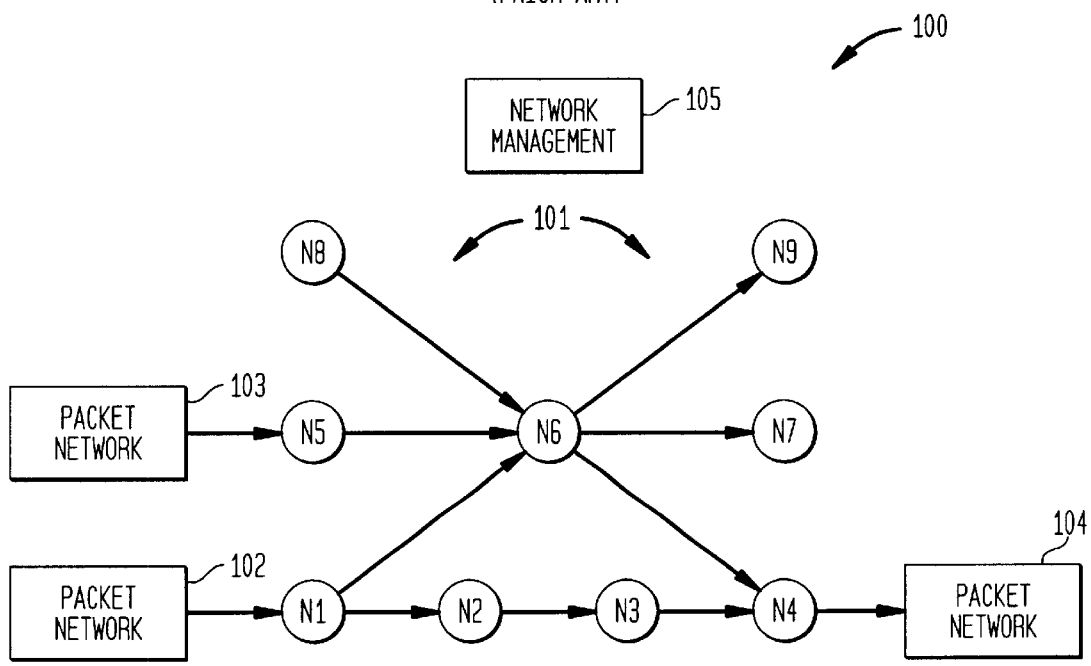
FIG. 1 shows a backbone network of the prior art having nodes interconnected through links that allow communication between lower-level packet networks.
Figure 2:
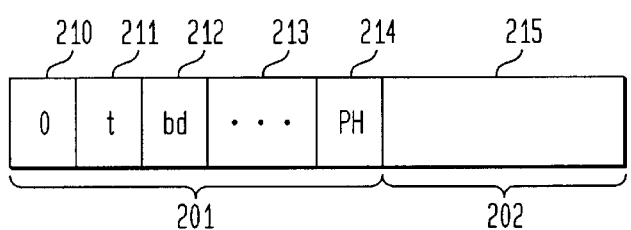
FIG. 2 shows an encapsulated packet employed by the backbone network of FIG. 1 to route packets from an ingress point to an egress point.

Sources S1, S2, and S3 generate packets for new or currently provisioned LSPs in network 300 that include fields identifying the ingress-egress point pair (e.g., address of either source S1, S2, or S3 and address of destination D1, D2, and D3). Signaling packets of, for example, RSVP or LDP may be used to communicate quality-of-service (QoS) attributes or guarantees, such as bandwidth, to network elements (routers of nodes); however, packets of LSPs may also include values for one or more service-level parameters corresponding to QoS attributes or guarantees. These packets of LSPs transferred through network 300 may conform to the MPLS standard and may have a format similar to that shown and described with respect to FIG. 2.

For network 300 shown in FIG. 3, three potential ingress-egress point pairs (source-destination pairs) (S1, S2), (S2, D2), and (S3, D3), are shown. For the following discussion, each link $l_{ij}$ interconnecting adjacent nodes $n_i$ and $n_j$ has an associated available capacity, termed residual bandwidth. Residual bandwidth of a link $l_{ij}$ is the difference between the total bandwidth of the link and the sum of the bandwidth demands of LSPs that are currently assigned to that link. Networks may exchange information regarding residual capacity of links (such as in QoS shortest path first (QoSPF) networks), which may be employed for distributed calculation of routes. Residual bandwidth may commonly be expressed in, for example, kbits/sec or Mbits/sec, or may be expressed as a percentage of the link's total capacity. Each link $l_{ij}$ interconnecting adjacent nodes $n_i$ and $n_j$ may also have an associated link cost. Link cost may be assigned to a particular link to allow routing algorithms to favor or disfavor routing through the particular link because of, for example, delay, cost to provide bandwidth, other traffic engineering considerations, or other physical link-layer considerations.

In general, a request arrives to network 300 to provision and route a path between an ingress point o and egress point t, and also to provide a route having a requested service level of bd (a "demand" bd). For the exemplary network of FIG. 3, this may be an LSP or other form of NTP request to provision a path between source-destination pair (S1, D2) with a requested bandwidth bd Mb/sec. LSP requests may arrive one at a time, with no a priori knowledge of the characteristics of demands for bandwidth by future LSP requests. In addition, no a priori knowledge of the characteristics of QoS attributes or guarantees; connection arrivals, hold time, or departures; and other traffic engineering information is necessarily available. The demand bd may be an "equivalent" or "effective" bandwidth value since the packets of a packet flow may represent a stochastic process with varying bandwidth needs. As is known in the art, service-level (e.g., QoS) attributes or requirements may be translated into an equivalent or effective bandwidth value. The equivalent or effective bandwidth value is a deterministic value approximating the stochastic variable based on peak and average packet rate, arrival and hold times, and connection duration.

Routing in accordance with the present invention evaluates and routes the LSP along paths through the network between ingress-egress point pairs. The set P is the set of specific (distinguished) node ingress-egress point pairs included in the network G(N, L, B) that are the potential ingress-egress point pairs (i.e., source-destination pairs (S1, D1), (S2,D2), . . . , (SK,DK)). An element of the set P is denoted as (s, d) (i.e., (s, d)∈P) where s and d correspond to a source and a destination node. Multiple LSPs may be provisioned between an element (s, d).

Each element (s, d) has an associated maximum packet flow (maxflow) value $\theta_{sd}$ that corresponds to an upper bound for the total bandwidth (or other service level) in a path that may be routed between a ingress-egress point pair, or element, (s, d), after routing with demands of currently provisioned LSP requests. The value $\theta_{sd}$ changes as bandwidth across links in the set L is assigned and re-assigned when provisioning and deleting LSPs. In addition, each element (s, d) of the set P may have an associated scalar weight $\alpha_{sd}$ that may correspond to a relative usage, importance, or cost of the particular ingress-egress point pair. The maxflow value $\theta_{sd}$ may decrease (increase) when bandwidth is allocated (released) for LSPs between the ingress-egress point pair (s, d). The maxflow value $\theta_{sd}$ may also decrease (increase) when bandwidth is allocated (released) for LSPs between other ingress-egress point pairs in the set P whose paths share common links between nodes with the path of the element (s, d).

An LSP request to network 300 may be either through a centralized network management system (not shown in FIG. 3) or by control messages provided to nodes N1–N11 of the network 300 in accordance with a distributed protocol. Either a centralized network management system and/or each network router implements constraint-based routing method for the LSP request and determines a path to be provisioned through the network corresponding to the requested LSP. Provisioning by either the centralized network management system and/or each network router allows RSVP control (e.g., QoS requests of the RSVP signaling protocol) to establish connections (packet flows) with, for example, a demanded bandwidth or other type of service level.

Figure 4:
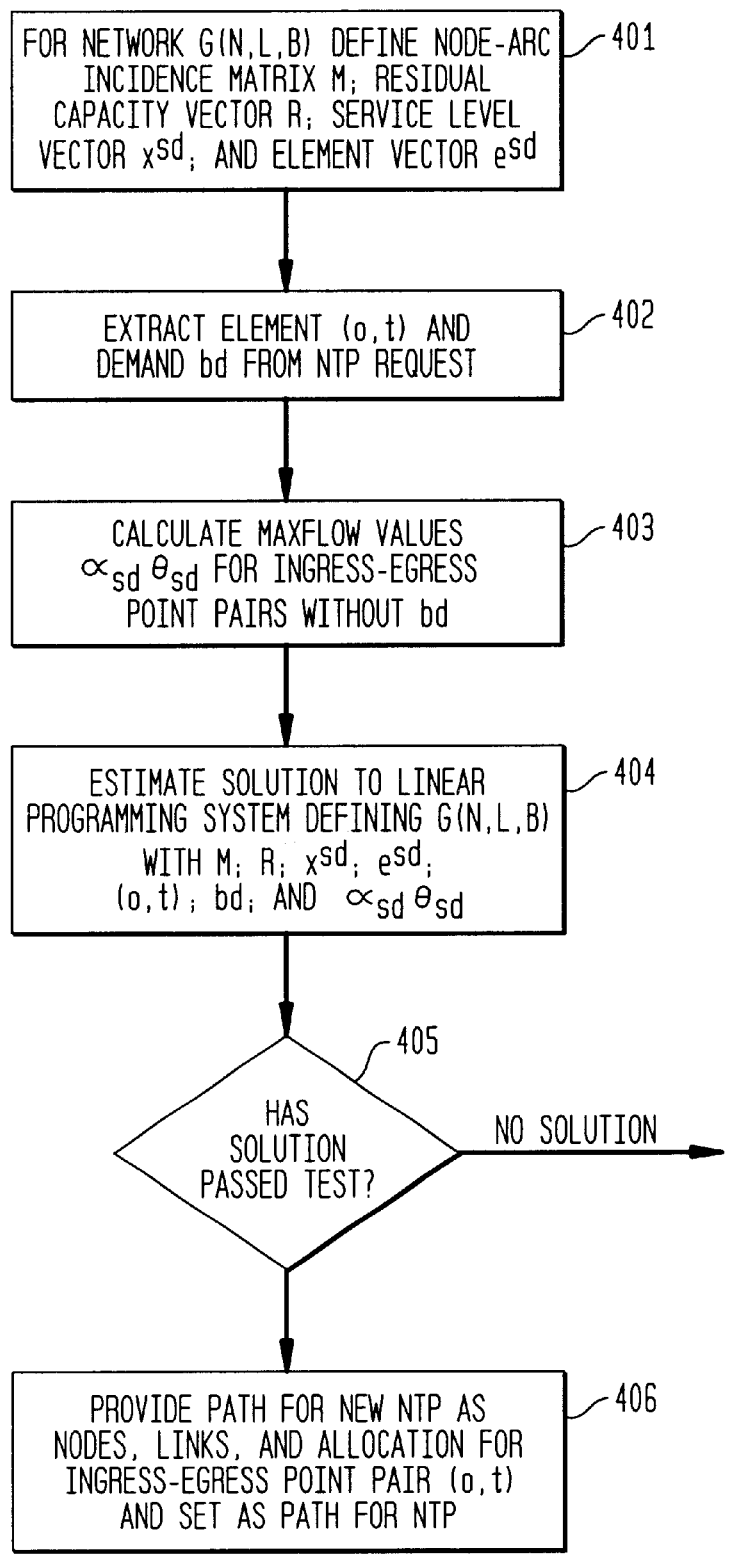
FIG. 4 is a flow chart showing an exemplary constraint-based method of routing packets in accordance with the present invention.

FIG. 4 is a flow chart showing exemplary embodiment of a constraint-based method of routing for an LSP request. First, at step 401, the following quantities for the network G(N, L, B) are defined:

The node-arc incidence matrix M is defined as an f×g matrix in which each row corresponds to a different node n of the set N, and each column corresponds to a different link l of the set L. The value for f is equal to the number of elements of the set N. and the value of g is equal to the number of elements of the set L. Each column has two, non-zero entries (i,j) for the corresponding link $l_{ij}$ between nodes $n_i$ and $n_j$. The column corresponding to link $l_{ij}$ has a "+1" value in the row i, a "−1" value in the row j, and a "0" value in each position corresponding to all other rows.

The residual capacity vector R of length g is the vector including the residual capacities for the set of links L. The values in the vector R are initialized to the corresponding available capacity values big of the set B. The residual capacity $r_{ij}$ of link $l_{ij}$ is defined as the difference between 1) the total link service level (e.g., bandwidth) $b_{ij}$ of link $l_{ij}$ and 2) the sum of the service levels (e.g., bandwidth demands) currently routed traffic (packet flows) on link $l_{ij}$. For the network, if the residual bandwidth of a link is greater than or equal to the bandwidth value of the requested demand bd, the link is referred to herein as a feasible link.

The service level vector $x^{sd}$ is a vector of length g corresponding to the element (s, d). The values in the vector $x^{sd}$ correspond to the route of packet flows in the set of links L to achieve the maxflow values $\alpha_{sd}\theta_{sd}$, as defined and described subsequently, between element (s, d) along the corresponding links of the ingress-egress point pair. Each position in the vector has a value that corresponds to a link.

The element vector $e^{sd}$ is a vector of length f of elements (s, d) having a "+1" value in position s, a "−1" value in position d, and "0" value in the other positions.

At step 402, the ingress point (source address o), egress point (destination address t), and demand bd are extracted from the LSP request (o, t, bd). At step 403, the weighted maxflow values $\alpha_{sd}\theta_{sd}$ for the set P are calculated (not counting demand bd for the added element (o, t)).

At step 404 the proposed solution for a linear/integer programming system is determined. The linear/integer programming system is either a split demand (linear programming system), non-split demand (integer programming system), or batch demand (integer programming system) implementation for routing packets of the LSP. Split demand is a demand bd that may be split over several paths, non-split demand is demand bd provisioned over one path, and batch demand is several non-split demand requests arriving together. The linear/integer programming system equations for split demand, non-split demand, and batch demand implementations are described subsequently.

The linear/integer programming system of step 404 is a set of equations based on the network definitions in step 401, the values of the ingress-egress point pair o and t and demand bd extracted in step 402, and the weighted maxflow values $\alpha_{sd}\theta_{sd}$ determined in step 403. The linear/integer programming system describes the state of the network G(NLB) once the new demand bd is routed.

At step 405 at test is optionally performed that examines the solution to the linear/integer programming system estimated in step 404. As is known in the art, a reliable or accurate solution may not be possible because of, for example, excessive system size or a requirement for higher accuracy than included in the program used to solve the system. The actual test employed depends on the particular technique selected to generate an approximate solution in step 404.

If the test of step 405 indicates that the solution passes the test, then the solution includes values in the vector $x^{ot}$ that corresponding to the links and allocated service level of the links for the path of the new LSP request for element (o, t). At step 406, the path for the new LSP request is provided, including links, allocated service level of the links, and nodes interconnected by the links. This path is the preferred path that may be set as the path employed for routing packets having a source-destination pair corresponding to the LSP request element (o, t).

If at step 405 the test indicates that the solution has not passed the test, then no solution exists and the method ends.

The linear/integer programming systems of step 404 of FIG. 4 for the split demand, non-split demand, and batch demand implementations are now described. For the split demand case, LSP requests arrive one at a time, and the demand bd (i.e., packets of the packet flow) of the LSP request may be allocated along either one or multiple paths within the network G(N, L, B). For the split demand case, LSP requests arrive one at a time. The split demand implementation determines a set of paths for all LSPs (new and currently provisioned) that desirably maximizes the maxflow values $\theta_{sd}$ and $\theta_{ot}$ for all ingress-egress point pairs (all elements in the set P and including the element (o, t). The linear programming system for the split demand implementation may be represented by equations (1) through (5):

$$\text{Max } \Sigma_{(s,d)\in P/(o,t)}\alpha_{sd}\theta_{sd} \text{ is true} \tag{1}$$

$$Mx^{sd}=\theta_{sd}e^{sd} \text{ for all } (s, d)\in P/(o, t) \tag{2}$$

$$Mx^{ot}=-bde^{ot} \tag{3}$$

$$x^{sd}+x^{ot}\leq R \text{ for all } (s, d)\in P/(o, t) \tag{4}$$

$$x^{sd}\geq 0 \text{ for all } (s, d)\in P \tag{5}$$

where (s, d)∈P /(o, t) is defined as all elements (s, d) of the set P but not including the element (o, t).

Equation (1), while being a "logic" equality, constrains the linear programming system so that when the new path is selected for element (o, t), the resulting allocation of the demand bd yields a network G(N,L). As given in equation (1), the sum of the weighted maxflow values for the network is maximized (here, the term "maximized" is in the mathematical sense in that the answer approximates (is near) a maximum value of the variable). An alternative to equation (1) may be to maximize the minimum maxflow values (to prevent some links from being driven to near or at zero maxflow value). In general, as would be apparent to one skilled in the art, many various criteria exist for which the relative maxflows between ingress-egress point pairs may be defined as being at a mathematical maximum. Maxflow values are upper bounds based on incremental LSP requests for bandwidth, or other service level. The selected criterion is assigned to equation (1) for the maxflow values.

For equation (1), solving the linear programming system determines the set of weighted maxflow values for the elements (s, d) of the network, except for the current pair (o, t), once a portion of each link's service level is allocated from the residual capacity of the link if the link is included in a potential selected path for the new LSP request. After the solution is found, the solution includes a route of the new path such that the sum of the weighted maxflow values for the network approximates (is near) a new (mathematical) maximum value.

Equation (2) specifies the path routing through the network for each element (s, d) of the currently provisioned LSP requests and sets the link service levels for the links of the elements path to the maxflow values of equation (1). Prior to adding the demand bd for element (o, t) of the LSP request, equations (1) and (2) are initially the path routing and current maxflow values $\theta_{sd}$ for the network, which values may be used as initial values for the linear programming system.

Equation (3) adds the demand bd for element (o, t) to the network. When demand bd is allocated over the links in the vector xot corresponding to element (o, t), the maxflow values change. The process of solving the linear programming system estimates values (steps 404–406 of FIG. 4) for the vector $x^{ot}$ until equation (1) holds. These values both identify the links for the path of the new LSP request as well as give the allocation over the corresponding link.

Equation (4) and equation (5) impose non-negativity constraints. Equation (4) specifies that the LSP is routed over links with sufficient residual bandwidth and equation (5) specifies only positive-valued flows over the links in a path. The linear programming system of equations (1) through (5) may be solved as a linear programming problem with currently available software applications, such as MATLAB IV or CPLEX.

The non-split demand implementation constrains routing of the bandwidth demand (packets of the packet flow) of the LSP request along a single path within the network. The non-split demand implementation may be represented as an integer programming system. For the non-split demand case, LSP requests arrive one at a time. The non-split demand implementation determines a set of paths for LSPs that maximizes the maxflow values for all the ingress-egress point pairs (all elements in the set P and including element (o, t). The integer programming system may be represented by equations (1) through (5) but is additionally constrained as given by equation (6):

$$x^{sd} \in \{0, bd\} \tag{6}$$

Equation (6) constrains the integer programming problem such that each component of xot is either 0 or bd. This constraint transforms a linear programming problem into an integer (0-1) programming problem, and may similarly be solved as the integer (0-1) programming problem with currently available software applications, such as MATLAB IV or CPLEX.

The batch demand implementation is similar to the non-split demand implementation except that the LSP requests arrive in small groups of one or more different LSP requests (referred to as batches). Equations (1) through (6) are modified as follows. First, the set Q is defined as a set of ingress-egress point pairs between which paths for LSPs are requested in a batch of LSP requests. An element (v, w) of the set Q is not an element of the set P (i.e., P/(v, w)). Each element (v, w) has a corresponding demand $bd^{vw}$ to be routed through the network. The batch demand implementation determines a set of paths for LSPs that maximizes the maxflow values for all the ingress-egress point pairs (all elements in the set P and in the set Q). The integer programming system may be represented by equations (7) through (12):

$$\text{Max } \Sigma_{(s,d) \in P} \alpha_{sd} \theta_{sd} \tag{7}$$

$$Mx^{sd} = \theta_{sd} e^{sd} \text{ for all } (s, d) \in P \tag{8}$$

$$Mx^{vw} = -bd^{vw} e^{vw} \text{ for all } (v, w) \in Q \tag{9}$$

$$x^{sd} + \sum_{(v,w) \in Q} x^{vw} \leq R \qquad \text{for all } (s, d) \in P \tag{10}$$

$$x^{sd} \geq 0 \text{ for all } (s, d) \in P \tag{11}$$

$$x^{vw} \in \{0, bd^{vw}\} \text{ for all } (v, w) \in Q \tag{12}$$

Equations (7) through (12) are similar to corresponding equations (1) through (6). Equation (12) constrains the integer programming problem such that the allocated link capacity to (v, w) corresponding to each position in vector $x^{vw}$ is either 0 or the whole demand $bd^{vw}$. This constraint transforms a linear programming problem into an integer (0-1) programming problem, and may similarly be solved as the integer (0-1) programming problem with currently available software applications, such as MATLAB IV or CPLEX.

Figure 5:
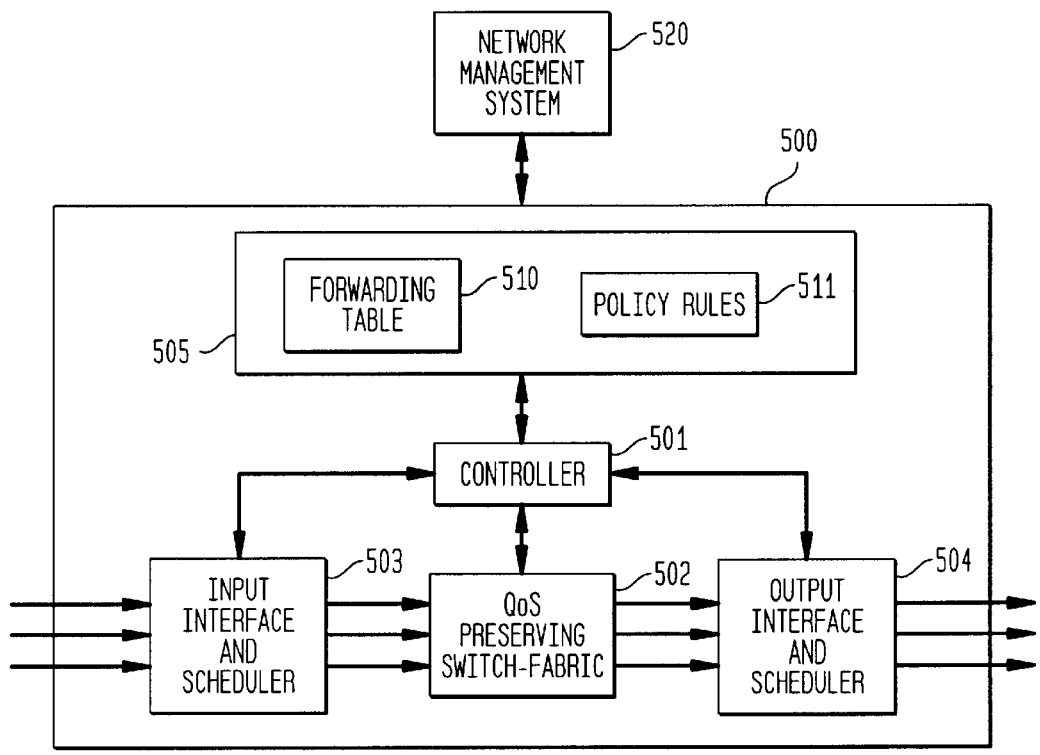
FIG. 5 is a block diagram of a routing processor that may employ the exemplary constraint-based method of routing packets shown in FIG. 4.

FIG. 5 shows an exemplary processing section of a router 500 implementing the constraint-based routing method of FIG. 4. Router 500 includes a controller 501, QoS preserving switch-fabric 502, input interface and scheduler 503, output interface and scheduler 504, and memory 505. QoS preserving switch-fabric 502 allows routing of packets through known or fixed delay, thereby allowing the network to account for the delay to maintain QoS levels. The input interface and scheduler 503 and output interface and scheduler 504 each include queues and service scheduling to maintain QoS levels. Memory 505 includes a forwarding table 510 and may also include a set of policy rules 511 for network routing. Controller 501 causes QoS preserving switch-fabric 502 to route packet flows between input interface and scheduler 503 and output interface and scheduler 504 based on source and destination addresses in accordance with the forwarding table 510. Forwarding table 510 may be constructed by controller 501 using information from a centralized network management system 520 that employs the constraint-based routing method shown in FIG. 4. Alternatively, forwarding table 510 may be constructed in accordance with the constraint-based routing method by the controller 501 from network topology information and an NTP request contained in a control packet received at input interface 503.

For network 300 of FIG. 3, using min-hop routing of the prior art, the path calculated for the LSP request (o=S1, t=D1, bd=1 unit) would be through nodes N1 to N7 to N8 to N5 (lowest number of hops=3, with a total link cost of 3 assuming that each link has an associated weight and/or link cost of 1). Min-hop routing of packets between S1 and D1 along this path through nodes N1 to N7 to N8 to N5 for the requested LSP removes link capacity available to LSPs currently routed along the path between S2 and D2 as well as the path between S3 and D3. This example illustrates that an alternative path, such as the path through nodes N1 to N2 to N3 to N4 to N5 may be preferred, even though this alternative path has more hops, since this path does not cause interference with LSPs of other source-destination pairs routed through nodes N7 and N8.

Figure 6:
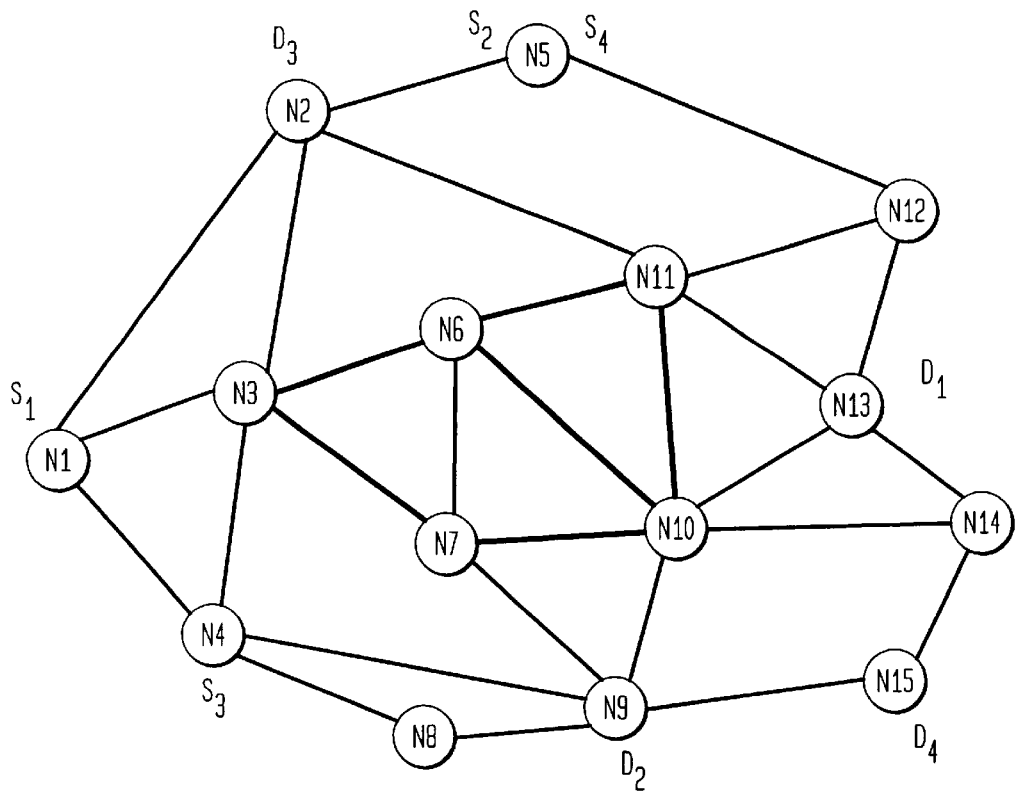
FIG. 6 shows an exemplary network of fourteen nodes having four ingress-egress point pairs for which a min-hop method and constraint-based method of the present invention are compared.

FIG. 6 shows an exemplary network of nodes N1–N15 having four ingress-egress point pairs (source-destination pairs) (S1, D1) through (S4, D4) and corresponding path weighted maxflow values $v_{11}$ through $v_{44}$ (each $v_{sd}=\alpha_{sd}\theta_{sd}$ with $\alpha_{sd}=1$, s,d =1–4). Table 1 gives routing paths for LSP requests (o, t, bd) for each of twenty-two sequential LSP requests to the network of FIG. 6 of both the min-hop routing method of the prior art and the constraint-based routing method of FIG. 4 for an exemplary non-split demand implementation. For the path sequences in Table 1, the first LSP request is the first demand bd routed in the network, and the prefix "N" for each node in FIG. 6 is omitted.

results to network routers may be preferred for coordination of provisioning of new paths. An implementation in each router of the network may be preferred when no centralized network management system exists and/or if the requested LSP is a distributed request through control packets routed through a network.

As would be apparent to one skilled in the art, the various functions of constraint-based routing method may be implemented with circuit elements or may also be implemented in the digital domain as processing steps in a software program. Such software may be employed in, for example, a digital signal processor, micro-controller or general-purpose computer.

The present invention can be embodied in the form of methods and apparatuses for practicing those methods. The present invention can also be embodied in the form of

TABLE 1

| | LSP Request | | | MIN-HOP Routing MAXFLOWS | | | | | CONSTRAINT-BASED Routing MAXFLOWS | | | | |
|---|---|---|---|---|---|---|---|---|---|---|---|---|---|
| # | o | t | bd | $v_{11}$ | $v_{22}$ | $v_{33}$ | $v_{44}$ | PATH | $v_{11}$ | $v_{22}$ | $v_{33}$ | $v_{44}$ | PATH |
| 1 | 5 | 9 | 1 | 34 | 23 | 46 | 23 | 5-2-1-4-9 | 36 | 23 | 47 | 23 | 5-12-11-10-9 |
| 2 | 5 | 15 | 2 | 34 | 21 | 45 | 21 | 5-12-13-14-15 | 36 | 21 | 45 | 21 | 5-12-13-14-15 |
| 3 | 5 | 9 | 2 | 30 | 19 | 42 | 19 | 5-2-1-4-9 | 36 | 19 | 43 | 19 | 5-2-11-10-9 |
| 4 | 1 | 13 | 2 | 28 | 19 | 38 | 19 | 1-2-11-13 | 34 | 19 | 43 | 19 | 1-4-9-10-13 |
| 5 | 4 | 2 | 3 | 22 | 19 | 35 | 19 | 4-1-2 | 34 | 19 | 40 | 19 | 4-3-2 |
| 6 | 5 | 15 | 1 | 22 | 18 | 35 | 18 | 5-12-13-14-15 | 34 | 18 | 39 | 18 | 5-12-13-14-15 |
| 7 | 4 | 2 | 2 | 18 | 18 | 33 | 18 | 4-1-2 | 34 | 18 | 37 | 18 | 4-3-2 |
| 8 | 1 | 13 | 2 | 16 | 18 | 29 | 18 | 1-2-11-13 | 32 | 18 | 37 | 18 | 1-3-6-11-13 |
| 9 | 5 | 15 | 2 | 16 | 16 | 27 | 16 | 5-12-13-14-15 | 32 | 16 | 35 | 16 | 5-12-13-14-15 |
| 10 | 5 | 15 | 3 | 16 | 13 | 24 | 13 | 5-12-13-14-15 | 32 | 13 | 32 | 13 | 5-2-3-7-9-15 |
| 11 | 1 | 13 | 1 | 15 | 13 | 24 | 13 | 1-3-6-10-13 | 31 | 13 | 32 | 13 | 1-3-6-10-13 |
| 12 | 4 | 2 | 2 | 15 | 13 | 22 | 13 | 4-3-2 | 31 | 13 | 30 | 13 | 4-3-2 |
| 13 | 5 | 15 | 1 | 15 | 12 | 21 | 12 | 5-12-13-14-15 | 31 | 12 | 29 | 12 | 5-12-13-14-15 |
| 14 | 1 | 13 | 1 | 14 | 12 | 21 | 12 | 1-3-6-10-13 | 30 | 12 | 29 | 12 | 1-3-7-10-13 |
| 15 | 1 | 13 | 1 | 13 | 12 | 21 | 12 | 1-3-6-10-13 | 29 | 12 | 29 | 12 | 1-3-6-11-13 |
| 16 | 1 | 13 | 3 | 10 | 12 | 21 | 12 | 1-3-6-10-13 | 26 | 12 | 29 | 12 | 1-3-6-11-13 |
| 17 | 1 | 13 | 2 | 8 | 12 | 21 | 12 | 1-3-6-10-13 | 24 | 12 | 29 | 12 | 1-3-6-11-13 |
| 18 | 5 | 15 | 1 | 8 | 11 | 20 | 11 | 5-12-13-14-15 | 24 | 11 | 28 | 11 | 5-2-3-7-9-15 |
| 19 | 1 | 13 | 3 | 5 | 11 | 20 | 11 | 1-3-6-10-13 | 21 | 11 | 25 | 11 | 1-4-9-10-11-13 |
| 20 | 5 | 15 | 2 | 5 | 9 | 18 | 9 | 5-12-13-14-15 | 21 | 9 | 23 | 9 | 5-12-11-10-9-15 |
| 21 | 5 | 9 | 1 | 5 | 8 | 17 | 8 | 5-2-3-4-9 | 21 | 8 | 22 | 8 | 5-12-11-10-9 |
| 22 | 5 | 15 | 2 | 5 | 6 | 15 | 6 | 5-2-3-4-9-15 | 20 | 6 | 20 | 6 | 5-12-11-10-14-15 |

Referring to Table 1, the initial sum of the maxflow values is 132, and after the 22$^{nd}$ iteration the difference between the sum of maxflow values for the min-hop and the constraint-based routing methods is 20 units (i.e., constraint-based routing has 20 units more available for future routing requests). After the 22$^{nd}$ iteration, the maxflow value $v_{11}$ between ingress and egress pair (S1, D1) is 5 units for min-hop routing and 20 units for constraint-based routing in accordance with the present invention. Consequently, there are 15 units more available for additional LSP requests to route traffic between the ingress and egress pair (S1, D1). As shown in Table 1, the fourth and nineteenth LSP requests, for example, are routed over paths with more hops than the path determined by the min-hop routing method of the prior art.

The constraint-based method such as shown in the exemplary embodiment of FIG. 4 may provide for the advantages of more efficient utilization of network service level capacity, reducing congestion of routers at network nodes, and higher packet throughput of the network. The constraint-based method may be implemented for a requested LSP by either a centralized network management system or each router of the network. An implementation employing a centralized network management system that distributes program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing data through a network of nodes interconnected by links and having a plurality of ingress-egress point pairs, comprising the steps of:
   (a) receiving a request for a path for routing data between one of the ingress-egress point pairs of the network; and
   (b) allocating service levels within the links of the network for the path taking into account impacts to existing service levels of paths corresponding to the other ingress-egress point pairs of the network, wherein step (b) comprises the steps of:
   (b1) defining a system of equations in accordance with the network based on a maximization criteria for a set of maxflow values;
   (b2) calculating the set of maxflow values for the network and system of equations defined in step (b1); and
   (b3) estimating a solution to the system of equations by allocating the service levels for the path accounting for the set of maxflow values.

2. The method as recited in claim 1, wherein the maximization criteria is either maximizing the sum of the maxflow values or maximizing the sum of the minimum maxflow values.

3. The method as recited in claim 1, wherein the step of defining in step (b1) includes a set of nodes, a set of links, and a set of available capacity values for each of the set of links of the network.

4. The method as recited in claim 3, wherein the system of equations for the request is either split demand linear programming system for a split demand case; an integer programming system for a non-split demand case; or a batch demand integer programming system for a batch demand case.

5. The method as recited in claim 1, further comprising the step of (b4) testing the solution estimated in step (b3) and, if the test fails, not allocating service levels for the path of the request.

6. The method as recited in claim 1, wherein the request of step (a) is a network tunnel request of either an asynchronous mode (ATM) network, an internet protocol (IP) network, or a multi-protocol label switched path (MPLS) network.

7. The method as recited in claim 6, wherein the request is in accordance with either a reservation protocol or a label distribution protocol.

8. A router that routes data in a network of nodes interconnected by links and having a plurality of ingress-egress point pairs, the router having a controller comprising:
   a control module for receiving a request for a path for routing data between one of the ingress-egress point pairs of the network; and
   a routing module for allocating service levels within the links of the network for the path taking into account impacts to existing service levels of paths corresponding to the other ingress-egress point pairs of the network;
   wherein the routing module allocates service levels by 1) defining a system of equations in accordance with the network based on a maximization criteria for a set of maxflow values; 2) calculating the set of maxflow values for the network and defined system of equations; and 3) estimating a solution to the system of equations by allocating the service levels for the path accounting for the set of maxflow values.

9. The invention as recited in claim 8, wherein the maximization criteria is either maximizing the sum of the maxflow values or maximizing the sum of the minimum maxflow values.

10. The invention as recited in claim 8, wherein the system of equations is defined using a set of nodes, a set of links, and a set of available capacity values for each of the set of links of the network.

11. The invention as recited in claim 10, wherein the system of equations for the request is either split demand linear programming system for a split demand case; an integer programming system for a non-split demand case; or a batch demand integer programming system for a batch demand case.

12. The invention as recited in claim 8, wherein the request is a network tunnel request of either an asynchronous mode (ATM) network, an internet protocol (IP) network, or a multi-protocol label switched path (MPLS) network.

13. The invention as recited in claim 12, wherein the request is in accordance with either a reservation protocol or a label distribution protocol.

14. A computer-readable medium having stored thereon a plurality of instructions, the plurality of instructions including instructions which, when executed by a processor, cause the processor to implement a method for of routing data through a network of nodes interconnected by links and having a plurality of ingress-egress point pairs, the method comprising the steps of:
   (a) receiving a request for a path for routing data between one of the ingress-egress point pairs of the network; and
   (b) allocating service levels within the links of the network for the path taking into account impacts to existing service levels of paths corresponding to the other ingress-egress point pairs of the network, wherein step (b) comprises the steps of:
   (b1) defining a system of equations in accordance with the network based on a maximization criteria for a set of maxflow values;
   (b2) calculating the set of maxflow values for the network and system of equations defined in step (b1); and
   (b3) estimating a solution to the system of equations by allocating the service levels for the path accounting for the set of maxflow values.

15. The invention as recited in claim 16, wherein the maximization criteria is either maximizing the sum of the maxflow values or maximizing the sum of the minimum maxflow values.

16. The invention as recited in claim 14, wherein the step of defining in step (b1) includes a set of nodes, a set of links, and a set of available capacity values for each of the set of linkks the network.

17. The invention as recited in claim 16, wherein the system of equations for the request is either split demand linear programming system for a split demand case; an integer programming system for a non-split demand case; or a batch demand integer programming system for a batch demand case.

18. The invention as recited in claim 14, further comprising the step of (b4) testing the solution estimated in step (b3) and, if the test fails, not allocating service levels for the path of the request.

19. The invention as recited in claim 14, wherein the request of step (a) is a network tunnel request of either an asynchronous mode (ATM) network, an internet protocol (IP) network, or a multi-protocol label switched path (MPLS) network.

20. The invention as recited in claim 19, wherein the request is in accordance with either a reservation protocol or a label distribution protocol.

* * * * *